United States Patent
Fraysse et al.

(10) Patent No.: US 9,546,623 B2
(45) Date of Patent: Jan. 17, 2017

(54) ASSEMBLY DEVICE FOR DOUBLE-SKINNED AIRCRAFT FUEL PIPES

(71) Applicant: Airbus Operations S.A.S., Toulouse (FR)

(72) Inventors: Damien Fraysse, Toulouse (FR); Thierry Gagnaire, Saint Lys (FR)

(73) Assignee: Airbus Operations S.A.S. (FR)

(*) Notice: Subject to any disclaimer, the term of this patent is extended or adjusted under 35 U.S.C. 154(b) by 198 days.

(21) Appl. No.: 14/598,336

(22) Filed: Jan. 16, 2015

(65) Prior Publication Data

US 2015/0219048 A1    Aug. 6, 2015

(30) Foreign Application Priority Data

Feb. 5, 2014 (FR) ..................................... 14 50881

(51) Int. Cl.
| | |
|---|---|
| *F16L 17/00* | (2006.01) |
| *F02M 37/00* | (2006.01) |
| *F16L 39/00* | (2006.01) |
| *B64D 37/00* | (2006.01) |
| *B64D 37/14* | (2006.01) |
| *B64D 37/32* | (2006.01) |

(52) U.S. Cl.
CPC .......... *F02M 37/0017* (2013.01); *B64D 37/00* (2013.01); *F16L 39/00* (2013.01); *F16L 39/005* (2013.01); *B64D 37/005* (2013.01); *B64D 37/14* (2013.01); *B64D 37/32* (2013.01)

(58) Field of Classification Search
USPC .................. 285/123.17, 123.3, 123.5–123.9, 295.1,285/123.11–123.16
See application file for complete search history.

(56) References Cited

U.S. PATENT DOCUMENTS 3,072,420 A * 1/1963 Lebeaux ............... E21B 33/047
                                                    166/97.5
3,080,180 A * 3/1963 Rector .................. E21B 33/047
                                                    166/97.5
(Continued)

FOREIGN PATENT DOCUMENTS

| EP | 2058573 A1 | 5/2009 |
| FR | 2978521 A1 | 2/2013 |
| WO | 2011/007100 A2 | 1/2011 |

OTHER PUBLICATIONS

FR1450881 Search Report dated Oct. 21, 2014.

*Primary Examiner* — Aaron Dunwoody
(74) *Attorney, Agent, or Firm* — Lerner, David, Littenberg, Krumholz & Mentlik, LLP (57) ABSTRACT

An assembly device between two sections of a double-skinned fuel pipe of an aircraft has a clamp for assembling the internal pipes, a coupling device for assembling the external pipes, a fitting extending between the ends of the external pipes of the first and second sections, with a shape complementary to the shape of an internal portion of the coupling device, and such that its section through any cutting plane perpendicular to the longitudinal axis common to the coupling device and the external pipes contains the smallest surface delimited by: a line corresponding to the intersection of the internal surface of the coupling device with this cutting plane and a straight line cutting said line at two points, this straight line being tangential to the orthogonal projection in this cutting plane, of the internal surface of the external pipes of the first or of the second section.

8 Claims, 6 Drawing Sheets

(56) References Cited

U.S. PATENT DOCUMENTS

| | | | | |
|---|---|---|---|---|
| 5,351,727 | A | * | 10/1994 | Sanders .................. F16L 39/04 138/109 |
| 8,172,272 | B2 | * | 5/2012 | Petit ...................... F16L 39/005 285/123.12 |
| 2004/0207197 | A1 | * | 10/2004 | Hoang .................. F16L 39/005 285/123.15 |
| 2012/0181384 | A1 | | 7/2012 | Courpet et al. |
| 2015/0130183 | A1 | * | 5/2015 | Statler, III ............ F16L 39/005 285/123.15 |

* cited by examiner

ASSEMBLY DEVICE FOR DOUBLE-SKINNED AIRCRAFT FUEL PIPES

FIELD OF THE INVENTION

The present invention relates to an assembly device for double-skinned aircraft fuel pipes allowing easier maintenance in the event of a leak.

BACKGROUND OF THE INVENTION

Figure 1:
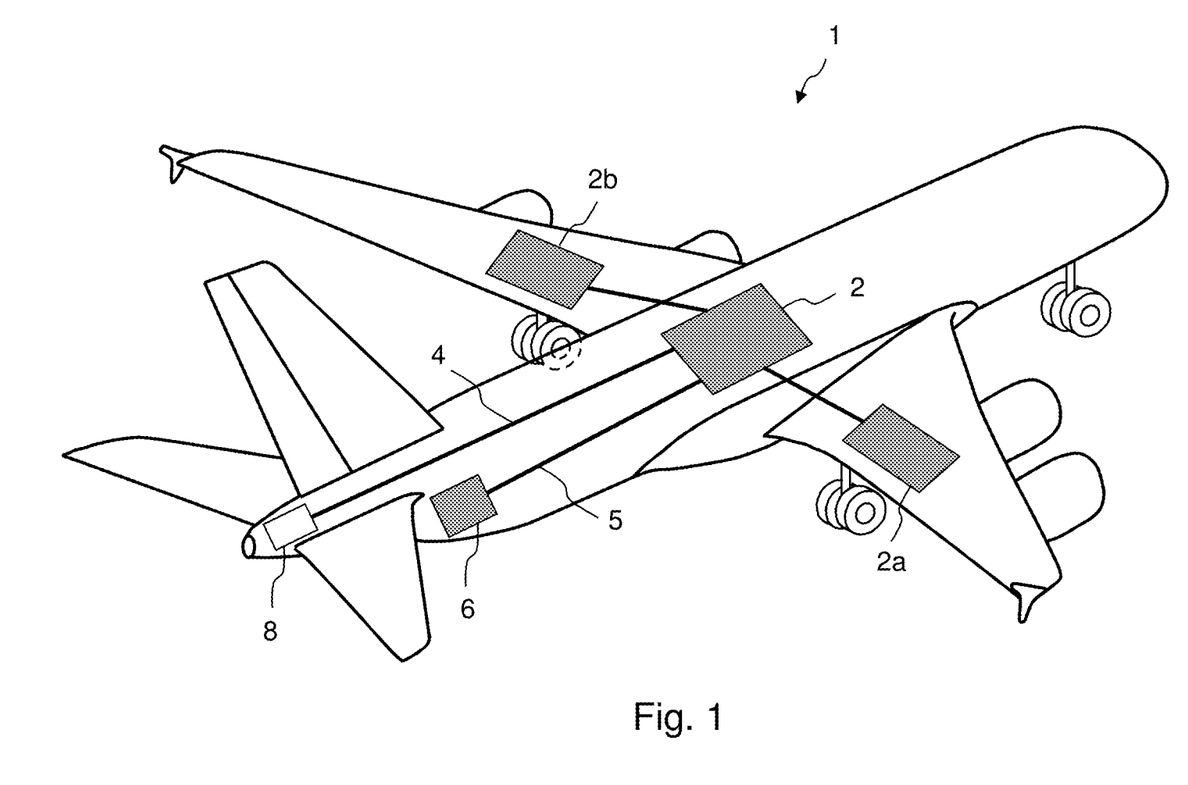
FIG. 1, as already described, is a schematic representation of an aircraft having fuel tanks and fuel pipes.
Figure 2:
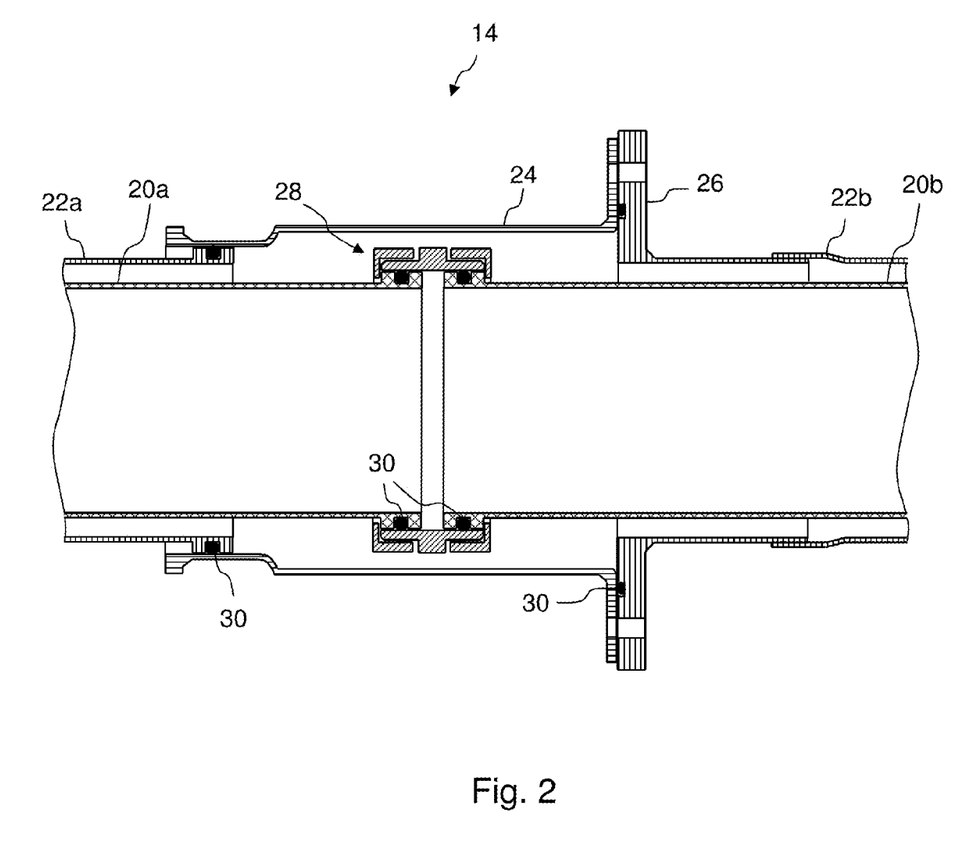
FIGS. 2 and 4, as already described, are longitudinal sectional views of an assembly device of double-skinned fuel pipes according to the prior art.
Figure 3:
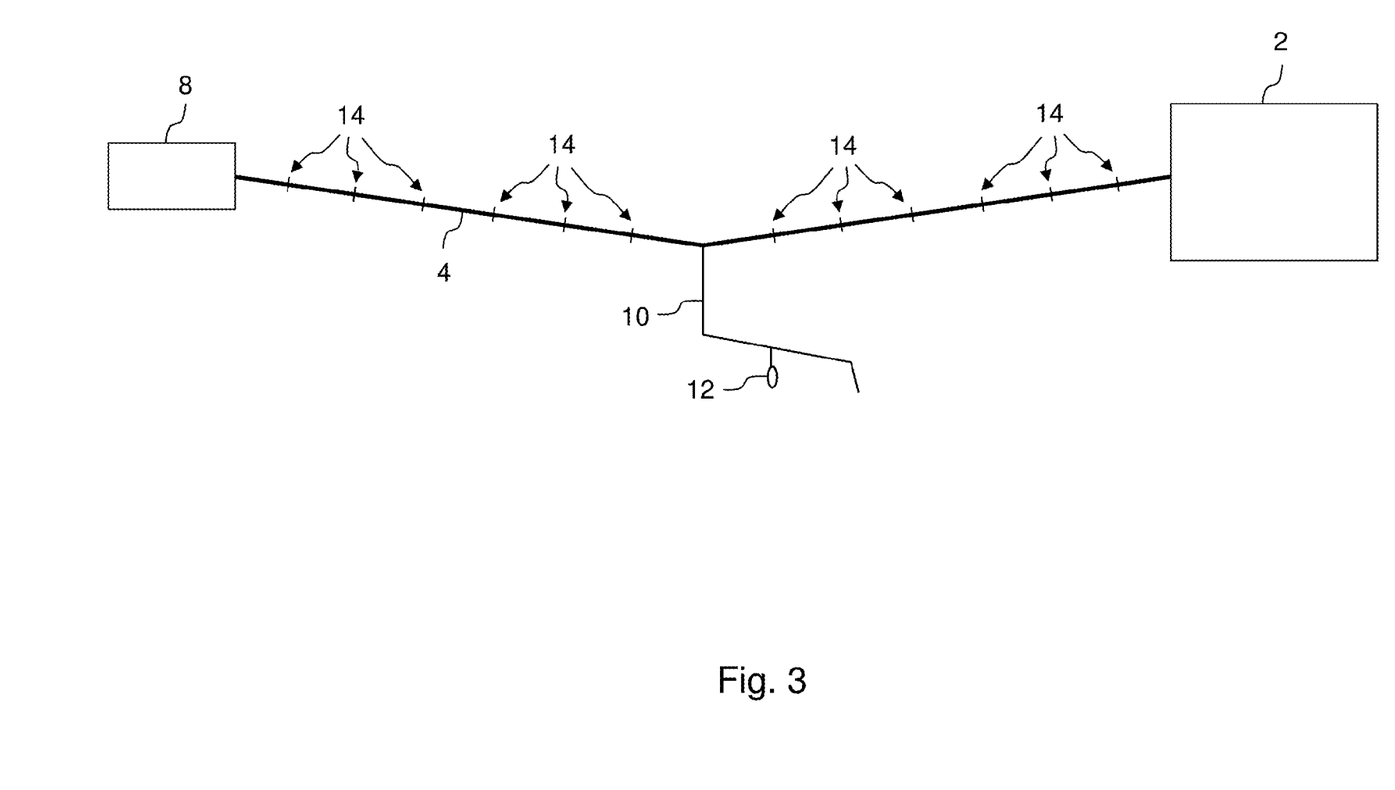
FIG. 3, as already described, is a schematic representation of the installation of a double-skinned fuel pipe in an aircraft.
Figure 4:
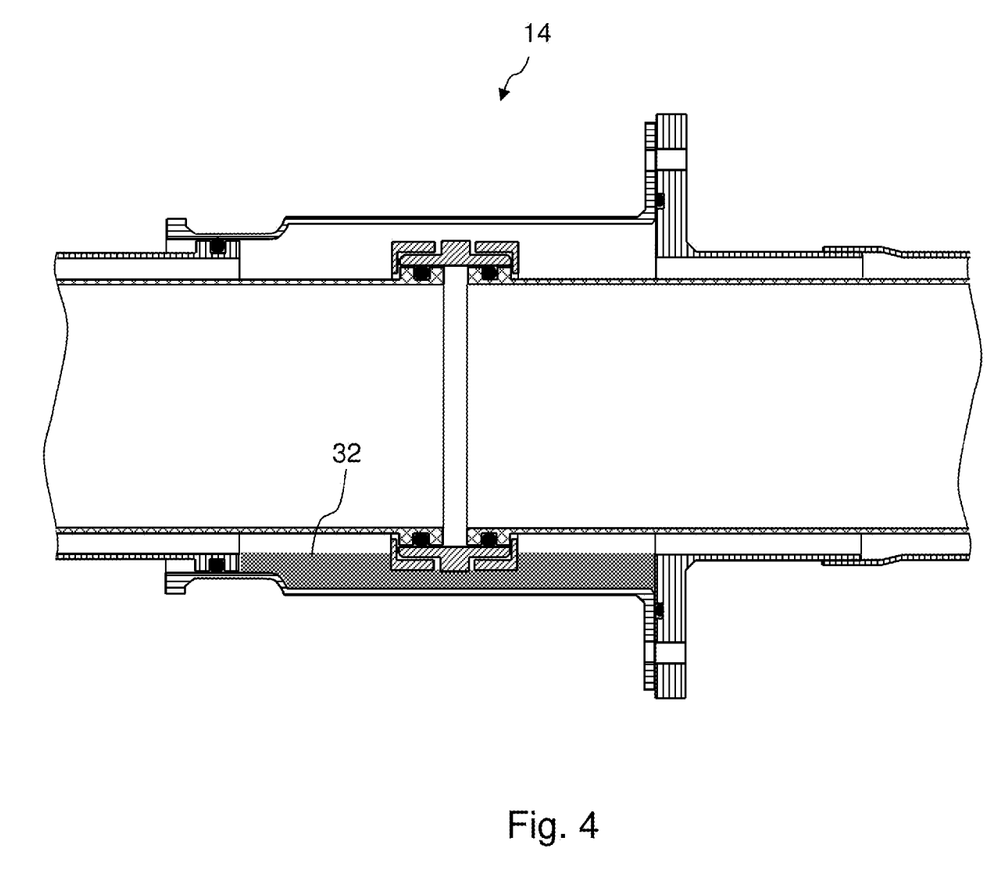

Modern aircraft, in particular transport planes, have fuel pipes which allow fuel to be transported between different portions of said aircraft. In particular, as shown in FIG. 1, a plane 1 has a first fuel pipe 4 between a central tank 2, 2a, 2b situated in a central portion of the plane (central section and/or wings) and an auxiliary power unit (APU) 8 situated in the rear portion of the plane's fuselage, so as to supply fuel to said APU device. Some planes also have an auxiliary tank 6 situated in the rear portion of the plane's fuselage or in a stabilizer fixed on this rear portion of the fuselage. In a case of this kind, a second fuel pipe 5 is disposed between this auxiliary tank 6 and the central tank 2, so as to allow exchanges of fuel between these tanks. These fuel pipes are of double-skinned design, so as to prevent fuel from being able to spread in the plane in the event of a leak. A fuel pipe of this kind is therefore made up of an internal pipe inserted in an external pipe. For practical installation reasons in the plane, this fuel pipe is made up of a plurality of sections assembled together and fixed to the plane's structure by means of supports. A first and a second consecutive section are thereby assembled together thanks to an assembly device. As depicted in FIG. 2, this assembly device 14 has a clamp 28 allowing one end of the internal pipe 20a of the first section to be assembled with one end of the internal pipe 20b of the second section. This assembly device likewise comprises a coupling device 24 allowing one end of the external pipe 22a of the first section to be assembled with one end of the external pipe 22b of the second section. For practical installation reasons in the plane, this end of the external pipe 22b of the second section comprises a part 26 which can, moreover, guarantee a fixing function to the structure of the plane. Sealing gaskets 30 are provided to guarantee the tightness of the assembly device 14. However, when the plane is in flight, its structure is subjected to deformations which can sometimes lead to leaks affecting the assembly devices 14 between the different sections of a fuel pipe fixed to said structure. In a case of this kind, fuel may be discharged at the clamp 28 between the first internal pipe 20a and the second internal pipe 20b. Given that the fuel pipe is double-skinned, the fuel which is discharged at the clamp is retained in the space formed between the internal pipes and the external pipes. As depicted in FIG. 3, a drain 10 is connected to a portion of the fuel pipe 4 representing a low point of said fuel pipe when the aircraft is on the ground. This drain allows any fuel retained in the space formed between the internal pipes and the external pipes to be removed towards the ground. This drain generally also has an indicator 12 which enables a fuel leak in the space formed between the internal pipes and the external pipes to be signaled. This indicator may, for example, be formed by a transparent capsule which fills up with fuel when fuel is discharged through the drain. This allows a maintenance operative to detect a leak of this kind easily. In such a case, the maintenance operative generally checks the assembly devices between the different sections of the pipe. If necessary, he tightens clamps or replaces worn gaskets. Once the maintenance operations are complete, he empties the indicator so that it is once again able to perform its function. However, given the conformation of the coupling device 24 between the external pipes 22a and 22b of the first section and of the second section at each assembly device 14, fuel may remain trapped in the different assembly devices without being discharged through the drain. This phenomenon is illustrated in FIG. 4, which represents an assembly device 14 between two sections of pipes depicted in a substantially horizontal position. The coupling device 24 forms a low point between the external pipe 22a of the first section and the external pipe 22b of the second section in which fuel 32 may accumulate without being able to escape unless the slope of the assembly device and of the pipe sections is modified. A modification of this kind of the slope of the assembly device and of the pipe sections may particularly take place while an aircraft is in flight. This means that following an aircraft maintenance operation in which a fuel leak problem in the space formed between the internal pipes and the external pipes has been solved, a change in the incline of the aircraft during flight can cause fuel which has accumulated in said low point formed by the coupling device to able to escape from said low point and move into the space formed between the internal pipes and the external pipes. This fuel may therefore migrate as far as the drain 10 and fill the indicator 12. Following this aircraft flight, the indicator may therefore contain fuel when there has not been a fresh leak. This may lead a maintenance operative to conduct a fruitless search for a fresh leak, even though the fuel contained in the indicator comes from a previous leak that has already been repaired.

BRIEF SUMMARY OF THE INVENTION

A problem addressed by the present invention is that of overcoming the aforementioned disadvantages. It relates to an assembly device between a first section and a second section of a double-skinned aircraft fuel pipe, said device comprising:
 a clamp allowing one end of an internal pipe of the first section to be assembled with one end of an internal pipe of the second section;
 a coupling device allowing one end of an external pipe of the first section to be assembled with one end of an external pipe of the second section.
This assembly device is notable in that it further comprises a fitting such that:
 this fitting extends between the end of the external pipe of the first section and the end of the external pipe of the second section;
 this fitting has a shape complementary to the shape of an internal portion of the coupling device and
 when the first section and the second section of the fuel pipe are assembled by means of the assembly device, the section of this fitting through any cutting plane perpendicular to the longitudinal axis common to the coupling device, the external pipe of the first section and the external pipe of the second section contains the smallest surface delimited by:
 on the one hand, a line corresponding to the intersection of the internal surface of the coupling device with said cutting plane and,
 on the other hand, a straight line cutting said line at two points, this straight line being tangential to the orthogonal projection in this cutting plane, of the internal surface of the external pipe of the first section and of the external pipe of the second section.

The fitting is positioned in the assembly device such that it is situated in the lowest portion of the internal surface of the coupling device, said lowest portion being regarded as such when the assembly device is disposed between two sections of pipes disposed substantially horizontally. Hence, the fitting makes it possible to prevent fuel from accumulating in said low point then circulating between the internal pipes and the external pipes of the double-skinned fuel pipe. Consequently, there is no risk of fuel migrating from said low point towards the drain and/or the indicator following a maintenance operation intended to repair a leak.

The fitting preferably has a first recess capable of containing at least part of a fixing integral with one of the internal pipes of the first section or of the second section.

Advantageously, the fitting has a second recess capable of containing part of said clamp.

According to a first embodiment, the fitting is realized in fluorosilicone.

According to a second embodiment, the fitting is realized in foam.

The invention likewise relates to a double-skinned aircraft fuel pipe having an assembly device as referred to above.

The invention also relates to an aircraft comprising a fuel pipe of this kind.

BRIEF DESCRIPTION OF THE DRAWINGS

The invention will be better understood by reading the following description and examining the attached figures.

FIG. 5a is longitudinal sectional view of an assembly device of double-skinned fuel pipes according to an embodiment of the invention;

FIG. 5b is a sectional view according to plane A-A of the assembly device represented in FIG. 5a;

Figures 5A, 5B:
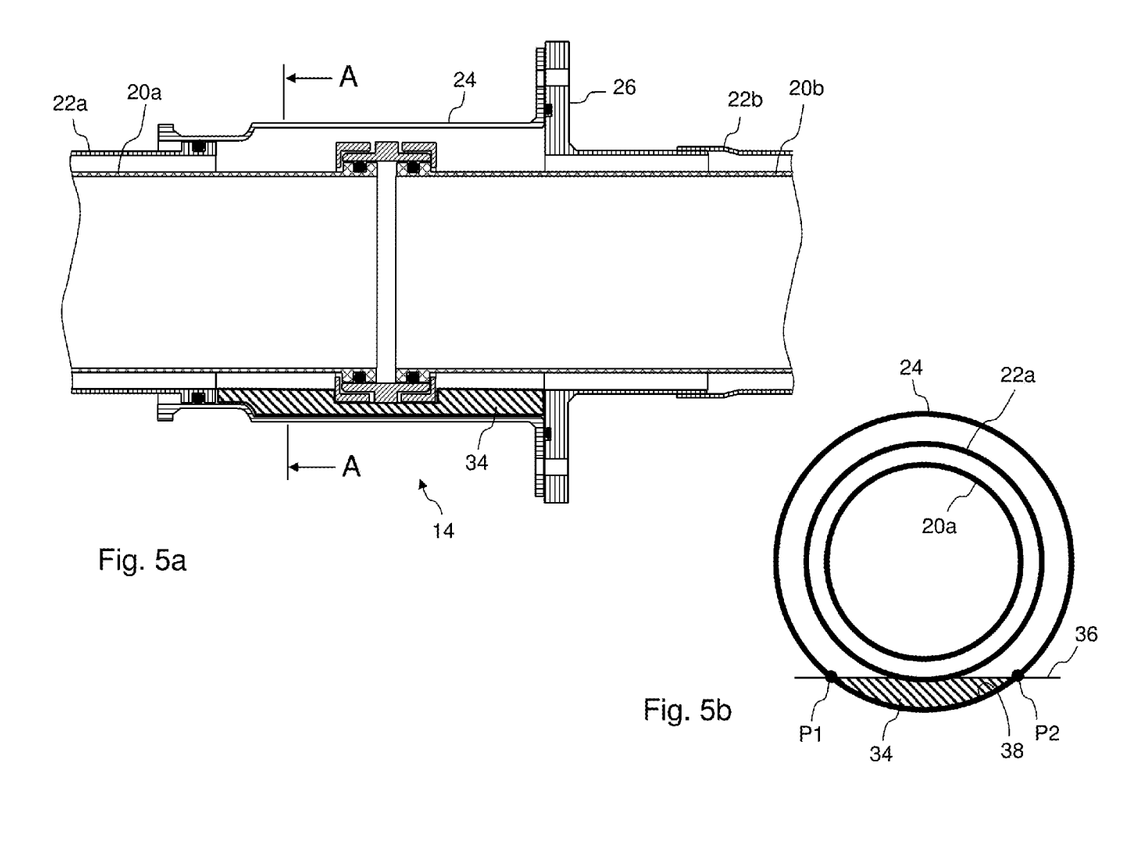

The double-skinned fuel pipe assembly device 14, as represented in FIGS. 5a and 5b, comprises a fitting 34. This fitting extends between the end of the external pipe 22a of the first section and the end 26 of the external pipe 22b of the second section. It has a shape complementary to the shape of an internal portion of the coupling device 24. Moreover, when the coupling device 24 is positioned so as to assemble the first section and the second section of the fuel pipe (as represented in FIG. 5a), the fitting 34 is such that its section through any cutting plane perpendicular to the longitudinal axis common to the coupling device, the external pipe of the first section and the external pipe of the second section contains the smallest surface delimited by:
- on the one hand, a line 38 corresponding to the intersection of the internal surface of the coupling device 24 with this cutting plane and
- on the other hand, a straight line 36 cutting said line 38 at two points P1, P2, said straight line being tangential to the orthogonal projection, in this cutting plane, of the internal surface of the external pipe 22a of the first section or of the external pipe 26 of the second section. The position of the fitting 34 relative to the coupling device 24, when said fitting is put into position in the assembly device 14, is such that the fitting 34 is situated in the lowest portion of the internal surface of the coupling device 24, said lowest portion being regarded as such when the assembly device 14 is disposed between two pipe sections disposed substantially horizontally.

This smallest surface delimited by the line 38 and by the straight line 36 corresponds to the section in said cutting lane of the fuel 32 liable to accumulate in the low point formed by the coupling device 24 when the assembly device 14 is disposed between two pipe sections disposed substantially horizontally, as represented in FIG. 4. Given that the section of the fitting 34 through the cutting plane contains said smallest surface, the fitting 34, when it is installed in the assembly device 14, makes it possible to prevent fuel from accumulating in said low point then circulating between the internal pipes and the external pipes of the pipe 4. Hence, there is no risk of fuel migrating from said low point towards the drain 10 and the indicator 12 after a maintenance operation intended to repair a leak in the pipe 4.

The section of the fitting 34 through said cutting plane advantageously corresponds to said smaller surface. Hence, there is no risk of the fitting 34 interfering with the flow of fuel between the internal pipes and the external pipes of the double-skinned fuel pipe.

Figures 6, 7:
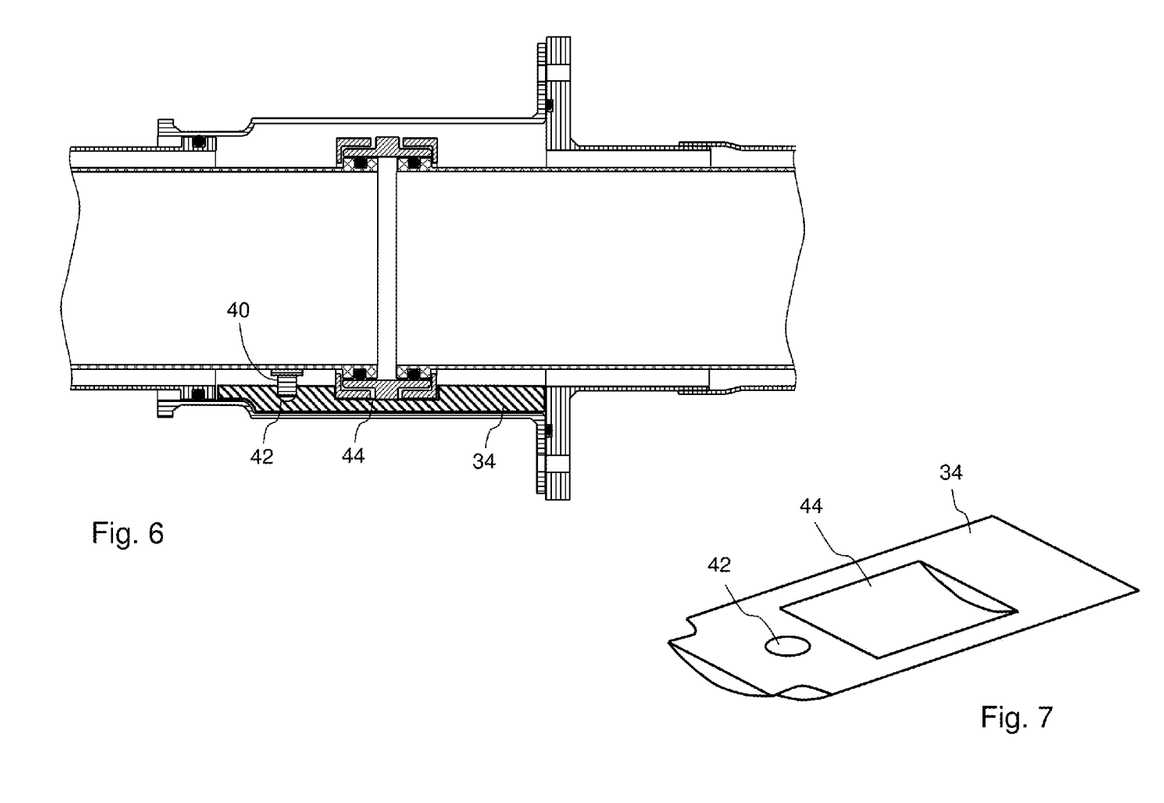
FIG. 6 is a longitudinal sectional view of a double-skinned fuel pipe assembly device according to a particular embodiment of the invention.
FIG. 7 is a perspective view of a fitting of the double-skinned fuel pipe assembly device according to a particular embodiment of the invention represented in FIG. 6.

In a particular embodiment, the internal pipe 20a of the first pipe or the internal pipe 20b of the second section has a fixing integral with said internal pipe. This fixing is situated beneath the lower portion of said pipe when the pipe is disposed in a substantially horizontal position. FIG. 6 illustrates the case in which this fixation 40 is integral with the first internal pipe 20a. The fitting 34 then comprises a first notch 42 with a shape complementary to the shape of a portion of said fixing 40, as represented in FIGS. 6 and 7. Hence, the fixing 40 and the notch 42 work together, so as to prevent the fitting 34 from rotating about the longitudinal axis common to the coupling device 24, the external pipe 22a of the first section and the external pipe 22b of the second section. This therefore allows the fitting 34 to be kept in the position in which it prevents fuel from accumulating in said low point.

Further advantageously, the fitting 34 has a second notch 44, with a shape complementary to the shape of a portion of the clamp 28. This allows the fitting 34 to be put into position in the assembly device 14 without being interfered with by said clamp 28.

According to a first variant, the fitting 34 is realized in a solid material. This allows any accumulation of fuel in the space occupied by said fitting to be prevented. This solid material may be fluorosilicone, for example.

According to a second variant, the material used in order to realize the fitting 34 is foam. In a case of this kind, fuel may penetrate the foam when the fitting is situated in a low point of the assembly device 14, but this fuel is then retained in said foam and there is therefore no risk of it flowing as far as the drain 10 or as far as the indicator 12. This foam may, for example, be rigid polymethacrylimide foam.

The invention claimed is:

1. An assembly device between a first section and a second section of a doubleskinned fuel pipe of an aircraft, said device comprising:

a clamp allowing one end of an internal pipe of the first section to be assembled with one end of an internal pipe of the second section;

a coupling device allowing one end of an external pipe of the first section to be assembled with one end of the external pipe of the second section; and a fitting extending between the end of the external pipe of the first section and the end of the external pipe of the second section and having a shape complementary to the shape of an internal portion of the coupling device, wherein, when the first section and the second section of the fuel pipe are assembled by the assembly device, the section of the fitting through any cutting plane perpendicular to a longitudinal axis common to the coupling device, the external pipe of the first section and the external pipe of the second section contains the smallest surface delimited by:

a line corresponding to the intersection of the internal surface of the coupling device with the cutting plane and, a straight line cutting said line at two points, the straight line being tangential to the orthogonal projection in the cutting plane, of the internal surface of the external pipe of the first section or of the external pipe of the second section.

2. The assembly device as claimed in claim 1 wherein the fitting has a first recess configured for containing at least part of a fixing integral with one of the internal pipes of the first section or of the second section.

3. The assembly device as claimed in claim 1 wherein the fitting has a second recess configured for containing part of said clamp.

4. The assembly device as claimed in claim 1 wherein the fitting is made of fluoro silicone.

5. The assembly device as claimed in claim 1 wherein the fitting is made of foam.

6. The assembly device as claimed in claim 5 wherein said foam is rigid polymethacrylimide foam.

7. A double-skinned fuel pipe of an aircraft comprising an assembly device comprising:

a clamp allowing one end of an internal pipe of the first section to be assembled with one end of an internal pipe of the second section;

a coupling device allowing one end of an external pipe of the first section to be assembled with one end of the external pipe of the second section; and a fitting extending between the end of the external pipe of the first section and the end of the external pipe of the second section and having a shape complementary to the shape of an internal portion of the coupling device, wherein, when the first section and the second section of the fuel pipe are assembled by the assembly device, the section of the fitting through any cutting plane perpendicular to a longitudinal axis common to the coupling device, the external pipe of the first section and the external pipe of the second section contains the smallest surface delimited by:

a line corresponding to the intersection of the internal surface of the coupling device with the cutting plane and, a straight line cutting said line at two points, the straight line being tangential to the orthogonal projection in the cutting plane, of the internal surface of the external pipe of the first section or of the external pipe of the second section.

8. An aircraft having a double-skinned fuel pipe comprising an assembly device comprising:

a clamp allowing one end of an internal pipe of the first section to be assembled with one end of an internal pipe of the second section;

a coupling device allowing one end of an external pipe of the first section to be assembled with one end of the external pipe of the second section; and a fitting extending between the end of the external pipe of the first section and the end of the external pipe of the second section and having a shape complementary to the shape of an internal portion of the coupling device, wherein, when the first section and the second section of the fuel pipe are assembled by the assembly device, the section of the fitting through any cutting plane perpendicular to a longitudinal axis common to the coupling device, the external pipe of the first section and the external pipe of the second section contains the smallest surface delimited by:

a line corresponding to the intersection of the internal surface of the coupling device with the cutting plane and, a straight line cutting said line at two points, the straight line being tangential to the orthogonal projection in the cutting plane, of the internal surface of the external pipe of the first section or of the external pipe of the second section.

* * * * *